(12) United States Patent
Huffman (10) Patent No.: US 9,133,075 B1
(45) Date of Patent: Sep. 15, 2015

(54) METHOD TO ELIMINATE ALL CARBON DIOXIDE EMISSIONS DURING THE PRODUCTION OF LIQUID FUELS FROM COAL AND NATURAL GAS

(71) Applicant: Gerald P Huffman, Lexington, KY (US)

(72) Inventor: Gerald P Huffman, Lexington, KY (US)

(*) Notice: Subject to any disclaimer, the term of this patent is extended or adjusted under 35 U.S.C. 154(b) by 0 days.

(21) Appl. No.: 14/281,027

(22) Filed: May 19, 2014

(51) Int. Cl.
    *C07C 1/04* (2006.01)
    *C10G 2/00* (2006.01)

(52) U.S. Cl.
    CPC ............ *C07C 1/0485* (2013.01); *C07C 1/041* (2013.01); *C10G 2/30* (2013.01); *C10G 2/33* (2013.01)

(58) Field of Classification Search
    CPC ........ C07C 1/0485; C07C 1/041; C10G 2/30; C10G 2/33
    See application file for complete search history.

(56) References Cited

U.S. PATENT DOCUMENTS

| | | | |
|---|---|---|---|
| 6,566,411 B2 | 5/2003 | Moore et al. | |
| 6,875,417 B1 | 4/2005 | Shah et al. | |
| 6,939,999 B2 | 9/2005 | Abazajian et al. | |
| 7,008,967 B2 | 3/2006 | Keyser et al. | |
| 7,846,979 B2 | 12/2010 | Rojey et al. | |
| 8,268,897 B2 | 9/2012 | Huffman | |
| 8,309,616 B2 | 11/2012 | Huffman | |
| 2012/0065278 A1* | 3/2012 | Huffman | 518/702 |

FOREIGN PATENT DOCUMENTS

| | | |
|---|---|---|
| WO | WO03072530 A1 | 9/2003 |
| WO | WO2004035196 A2 | 4/2004 |
| WO | WO2008134484 A3 | 11/2008 |

OTHER PUBLICATIONS

Henry, J. Eyring, "The Activated Complex in Chemical Reactions," J. Chem. Phys. 3, 107 (1935).
Irving Wender, "Reactions of Synthesis Gas," Fuel Processing Technology 48, 189-297 (1996).
F. E. Huggins and G. P. Huffman, "Speciation of Elements in NIST Particulate Matter SRMs 1648 and 1650," J. of Hazardous Materials, 74, 1-23 (1999).
F.E. Huggins, N. Shah, G.P. Huffman, and J. D. Robertson, "XAFS Spectroscopic Characterization of Elements in Combustion Ash and Fine Particulate Matter," Fuel Proc. Tech., 65-66, 203-218 (2000).
N. Shah, D. Panjala, and G.P. Huffman, "Hydrogen Production by Catalytic Decomposition of Methane," Energy & Fuels, 15, 1528-1534 (2001).
N. Shah, D. Panjala, and G.P. Huffman, "Production of pure hydrogen and carbon nanostructures by catalytic non-oxidative dehydrogenation of ethane and propane," Energy & Fuels, 18, 727-736 (2004).
Y. Wang, N. Shah, and G.P. Huffman, "Pure Hydrogen Production by Partial Dehydrogenation of Cyclohexane and Methylcyclohexane over Nanotube-Supported Pt and Pd Catalysts," Energy & Fuels, 18, 1429-1433 (2004).
Stephen J. Miller, Naresh Shah, and Gerald P. Huffman, "Conversion of Waste Plastic to Lubricating Base Oil," Energy & Fuels, 19, 1580-1586 (2005).
N. Shah, S. Ma, Y. Wang, G.P. Huffman, "Semi-continuous hydrogen production from catalytic methane decomposition using a fluidized-bed reactor," Int. J. of Hydrogen Energy 32, 3315-3319 (2007).
Z. Spitalskya, et al, "Carbon nanotube-polymer composites: Chemistry, processing, mechanical and electrical Properties," Progress in Polymer Science, 35, 357-401 (2010).
G.P. Huffman, "Incorporation of catalytic dehydrogenation into Fischer-Tropsch synthesis of liquid fuels from coal to minimize carbon dioxide emissions," Fuel, 90, 2671-2676 (2011).
G.P. Huffman, "Zero emissions of CO2 during the production of liquid fuel from coal and natural gas by combining Fischer-Tropsch synthesis with catalytic dehydrogenation," Fuel, 109, 206-210 (2013).

\* cited by examiner

*Primary Examiner* — Sudhakar Katakam
(74) *Attorney, Agent, or Firm* — Michael Coblenz (57) ABSTRACT

This invention relates to the production of liquid fuels from coal and natural gas and, more specifically, to a new process that combines Fischer-Tropsch synthesis (FTS) with catalytic dehydrogenation (CDH) and methane injection (MI) into the CDH reactor (FTS-CDH-MI) to eliminate all carbon dioxide emissions during the production of liquid fuels. The additional methane for the FTS-CDH-MI process can be derived from natural gas produced by hydro-fracking. The addition of methane in the CDH process eliminates the need for the standard water-gas shift (WGS) reaction to the syngas, which is used to increase the hydrogen ($H_2$) of the syngas in FTS. This eliminates the use of water in the process and eliminates entirely the production of $CO_2$. In addition to producing the $H_2$ needed for FTS, this process (FTS-CDH) converts the C in these gases into multi-walled carbon nanotubes (MWCNT).

12 Claims, 7 Drawing Sheets

METHOD TO ELIMINATE ALL CARBON DIOXIDE EMISSIONS DURING THE PRODUCTION OF LIQUID FUELS FROM COAL AND NATURAL GAS

CROSS REFERENCE TO RELATED APPLICATIONS

Not Applicable.

STATEMENT REGARDING FEDERALLY SPONSORED RESEARCH

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC

Not Applicable

BACKGROUND OF THE INVENTION

1. Field of the Invention

This invention relates to the production of liquid fuels from coal and natural gas and, more specifically, to a method to eliminate carbon dioxide emissions and avoid the usage of water during the production of said fuels.

2. Description of the Related Art

A method to eliminate all carbon dioxide ($CO_2$) emissions during the production of liquid fuels from coal and natural gas has been developed. Gasification of coal or coal-biomass mixtures produces synthesis gas (syngas), a mixture of hydrogen ($H_2$) and carbon monoxide (CO) with $H_2$/CO ratios in the range of approximately 0.5 to 0.9. Production of liquid fuels by Fischer-Tropsch synthesis (FTS) requires syngas with $H_2$/CO ratios ≥2.0. Traditionally, the additional $H_2$ required has been produced by the water-gas shift (WGS) reaction, which is shown below.

$$H_2O + CO \rightarrow H_2 + CO_2 \quad (1)$$

Unfortunately, the WGS reaction produces one molecule of $CO_2$ and uses one molecule of $H_2O$ for each molecule of $H_2$ it produces. There is currently a great deal of concern about the production of $CO_2$, which is a green house gas, and a desire to eliminate or reduce the production of $CO_2$ as much as possible.

For a large FTS plant, the WGS reaction produces huge amounts of $CO_2$ and uses very large amounts of $H_2O$. This patent demonstrates that the required $H_2$ can be produced with no production of $CO_2$ and no usage of $H_2O$ by combining Fischer-Tropsch synthesis (FTS) with catalytic dehydrogenation (CDH) of: (1. the gaseous hydrocarbons produced by FTS; and 2. additional methane injection (MI) into the CDH reactor.) This combined process will henceforth be designated as (FTS-CDH-MI). The additional methane for the (FTS-CDH-MI) process can be derived from natural gas that is currently being produced very economically by hydrofracking. Separation of methane from the other components of natural gas such as $CO_2$ can be achieved by pressure-swing adsorption.

The (FTS-CDH-MI) process eliminates the need for the water-gas shift (WGS) reaction, which has traditionally been used to increase the $H_2$ content of the syngas used in FTS. This eliminates the production of $CO_2$ and the use of water while producing the $H_2$ needed for FTS of liquid fuels. As a bonus, the CDH reaction in the FTS-CDH-MI process produces a valuable by-product, multi-walled carbon nanotubes (MWCNT), which have many energy-related uses, as discussed below.

This research has demonstrated that MWCNT make excellent catalyst supports. They can be used to support many types of catalysts, including catalysts for FTS, CDH of hydrocarbon gases, and CDH of liquid hydrocarbons. Due to the fact that the MWCNT are normally not more than 7-10 nm in diameter, catalyst particles formed on the MWCNT supports by precipitation methods are typically about 1-3 nm in diameter. We have used Co-based catalysts supported on MWCNT for FTS and Fe-alloy catalysts (Fe—Ni, Fe—Mn, Fe—Pd and Fe—Mo) supported on MWCNT for CDH of methane, ethane, and propane. The Fe—Ni, Fe—Mn, and Fe—Pd catalysts all have a face-centered cubic (fcc) {fcc—austenitic} structure, while the Fe—Mo structure is somewhat more complicated. All four catalysts exhibit high activity for CDH of hydrocarbon gases. The Fe—Ni and Fe—Mn catalysts are also attractive because of the relatively low cost of Fe, Ni, and Mn. It is interesting to note that Fe—Mn alloys, which have the widest {(fcc)/austenitic} phase range of all the Fe-based alloy catalysts tested (33 to 53 at. % Mn at 300° C.), also exhibit the slowest rate of catalyst de-activation for CDH of methane in a quartz tube plug-flow reactor that has been observed to date (approximately 2% per hour).

In a somewhat different application, it was demonstrated that Pt nanoparticles 1-3 nm in diameter supported on stacked-cone nanotubes (SCNT) are excellent catalysts for the CDH of high-hydrogen content liquid hydrocarbons, such as cyclohexane and methyl-cyclohexane. The SCNT are produced by CDH of ethane, propane, and methane in the relatively low temperature range of 450 to 500° C. These catalysts are also active for the CDH of decalin and tetralin. CDH of liquid hydrocarbons could be valuable for the development of cars, trucks, and other vehicles powered by hydrogen fuel cells. The CDH of cyclohexane produces pure $H_2$ and benzene, which is considered to be a pollutant. However, it is found that CDH of methyl-cyclohexane produces pure $H_2$ and toluene, a valuable chemical. Toluene is an aromatic hydrocarbon that is widely used as an industrial feedstock and as a solvent. It is an important organic solvent, but it is also capable of dissolving a number of inorganic chemicals such as sulfur, iodine, bromine, phosphorus, and other non-polar covalent substances.

Synthesis gas (syngas) is a mixture of hydrogen ($H_2$) and carbon monoxide (CO) produced by gasification of coal or mixtures of coal+biomass in oxygen and steam at high temperatures and pressures. Typically, coal constitutes 80-100% of the gasification feedstock. The Fischer-Tropsch synthesis (FTS) catalytically converts such syngas into liquid fuels and smaller amounts of hydrocarbon gases (methane, ethane, propane, etc.). The primary products of FTS are normally clean, high quality transportation fuels, including gasoline, jet fuel, and diesel fuel. The synthetic fuels resulting from the FTS process advantageously increase energy diversity. They also burn very cleanly and thus hold the promise of additional improved environmental performance, particularly for decreased emissions of fine airborne particulate matter, a topic of significant environmental concern. ("Speciation of Elements in NIST Particulate Matter SRMs 1648 and 1650," F. E. Huggins and G. P. Huffman, 1999, *J of Hazardous Materials*, 74, 1-23); ("XAFS Spectroscopic Characterization of Elements in Combustion Ash and Fine Particulate Matter," F. E. Huggins, N. Shah, G. P. Huffman, and J. D. Robertson, 2000, *Fuel Proc. Tech.*, 65-66, 203-218 [Special Issue on Air Quality: Mercury, Trace Elements and Particulate Matter].)

Two previous patents by the applicant address the progression of methods for the reduction of $CO_2$ during the production of liquid fuels from syngas derived from coal and natural gas (U.S. Pat. No. 8,268,897 and U.S. Pat. No. 8,309,616). The teachings and disclosures of both patents are incorporated herein by reference.

Two publications by the applicant and his collaborators demonstrate that CDH of ethane and propane produces a large amount of methane and small amounts of $H_2$, multi-walled carbon nanotubes (MWCNT), and amorphous carbon. (N. Shah, D. Panjala, and G. P. Huffman, "Hydrogen Production by Catalytic Decomposition of Methane", *Energy & Fuels*, 15 (2001) 1528-1534); and (N. Shah, D. Panjala, and G. P. Huffman, "Production of pure hydrogen and carbon nanostructures by catalytic non-oxidative dehydrogenation of ethane and propane", *Energy & Fuels*, 18 (2004), 727-736).

A patent covering this material (U.S. Pat. No. 6,875,417) was obtained by the applicant and his co-inventors. The teachings of this patent and these publications are fully incorporated herein by reference.

A recent publication by the applicant demonstrates that a significant amount of the $H_2$ required by FTS to produce liquid fuels can be produced by catalytic dehydrogenation (CDH) of the hydrocarbon gases produced by FTS. (G. P. Huffman, "Incorporation of catalytic dehydrogenation into Fischer-Tropsch synthesis of liquid fuels from coal to minimize carbon dioxide emissions", *Fuel*, 90 (2011) 2671-2676). A patent covering this material was awarded to the applicant. (U.S. Pat. No. 8,268,897). The teachings of the patent are fully incorporated herein by reference.

The hydrocarbon gases produced by FTS include both paraffins ($C_nH_{(2n+2)}$) and olefins ($C_nH_{2n}$), with n=1 to 4, commonly referred to as (C1-C4) gases. (Irving Wender, "Reactions of Synthesis Gas, SPECIAL ISSUE, Fuel Processing Technology 48 (1996) 189-297). During the CDH reaction, the C2-C4 gases are quickly converted into methane and small amounts of amorphous carbon and $H_2$ at temperatures of approximately 400 to 500° C. The dominant reaction above 500° C. is the CDH of methane;

$$CH_4 \leftrightarrow [CH_4^\ddagger] \rightarrow C_M + 2H_2 \quad (2)$$

$C_M$ denotes carbon in the form of multi-walled carbon nanotubes (MWCNT). The CDH reaction is considered to be in a state of pseudo-equilibrium, denoted by the double arrow and the activated complex symbol, $[CH^\ddagger_4]$. This concept was invented by Henry Eyring (Eyring, Henry, J. Chem. Phys. 3 (1935), 107-115). This reaction is obviously preferable to the WGS reaction (equation (1) on page 1) since it produces zero $CO_2$ and uses no water. Its only products are $H_2$ and MWCNT, a valuable by-product.

Figure 1:
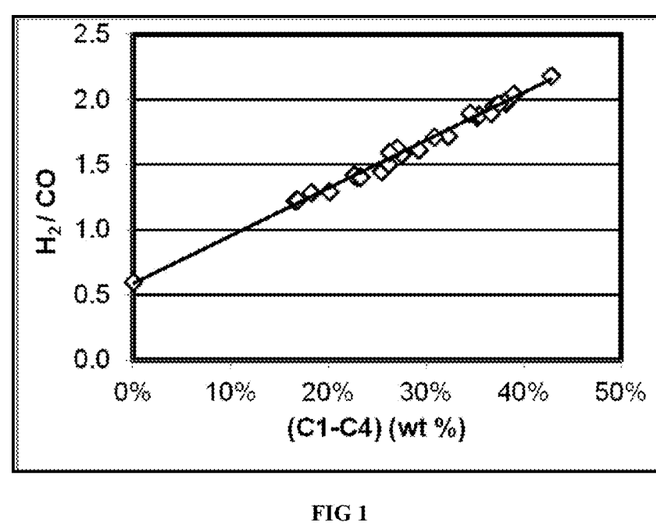
FIG. 1 shows the $H_2$/CO molar ratio versus the weight by percent of paraffin and olefin gases (wt. %(C1-C4)) subjected to CDH, with the initial $H_2$/CO ratio=0.8.

Formation of the MWCNT occurs because C atoms produced by CDH and deposited onto the catalyst surface at high temperatures diffuse into the catalyst. As the metallic catalyst becomes saturated with C, the carbon atoms precipitate out of the catalyst surface in the form of MWCNT, which is apparently the low energy structure. Typical results are shown in FIG. 1, where the $H_2$/CO molar ratios produced by the FTS-CDH process are plotted as a function of (C1-C4) (wt. %) using experimental data from 26 different FTS data sets obtained from 10 different papers. These papers are referenced in a recent publication by the applicant (Gerald P. Huffman, "Incorporation of catalytic dehydrogenation into Fischer-Tropsch synthesis of liquid fuels from coal to minimize carbon dioxide emissions", *Fuel*, 90 (2011) 2671-2676). Only FTS data obtained using cobalt-based FTS catalysts were used in obtaining the data shown in FIG. 1. No FTS data obtained using iron-based FTS catalysts were used because Fe is an excellent catalyst for the WGS reaction, which the current invention avoids in order to eliminate $CO_2$ emissions and unnecessary usage of water.

SUMMARY OF THE INVENTION

This invention provides a process that eliminates all $CO_2$ emissions and achieves zero usage of water ($H_2O$) during the production of liquid fuels from coal and natural gas using the Fischer-Tropsch synthesis (FTS) process. This can be achieved by combining FTS with catalytic dehydrogenation (CDH) and methane injection (MI) into the CDH reactor (FTS-CDH-MI). The process also results in the creation of a valuable by-product, multi-walled carbon nanotubes (MWCNT). In accordance with the purposes of the present invention as described herein, an improved method is provided for producing liquid transportation fuels from coal and natural gas. The method comprises the steps of gasifying coal or coal-biomass mixtures to produce syngas, a mixture of $H_2$ and CO, subjecting that syngas to FTS to produce a hydrocarbon product stream, and separating that hydrocarbon product stream into (C1-C4) hydrocarbons and C5+ hydrocarbons. The C5+ hydrocarbons are separately processed into high quality liquid transportation fuels. The (C1-C4) hydrocarbons are subjected to CDH to produce $H_2$ and MWCNT, a valuable by-product. The $H_2$ is added to the syngas to increase the $H_2$/CO ratio to ≥2.0, which enables FTS of the syngas to produce liquid fuels. If additional $H_2$ is required it can be produced by CDH of methane separated from natural gas, which is currently abundant due to hydro-fracking.

BRIEF DESCRIPTION OF THE DRAWINGS

FIG. 6 a shows the $H_2$/CO ratios produced by FTS-CDH-MI of both (C1-C4) and the wt. % of methane from natural gas (ΔC1 (wt %) injected into the CDH reactor, with an initial $H_2$/CO value of 0.6.

FIG. 6 b shows the $H_2$/CO ratios produced by FTS-CDH of wt. % (C1-C4) products.

FIG. 10 *a*. is a scanning electron microscope micrograph (SEM) image of a cluster of multi-walled carbon nanotubes (MWCNT) produced by the disclosed process.

FIG. 10 *b* is a transmission electron micrograph (TEM) image of one MWCNT with nine concentric graphene shells. The small carbon particulate coating of the outer MWCNT shell is amorphous carbon that can be removed by washing in a dilute nitric acid solution.

DETAILED DESCRIPTION OF THE INVENTION

Detailed embodiments of the present invention are disclosed herein. It is to be understood that the disclosed embodiments are merely examples of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 3:
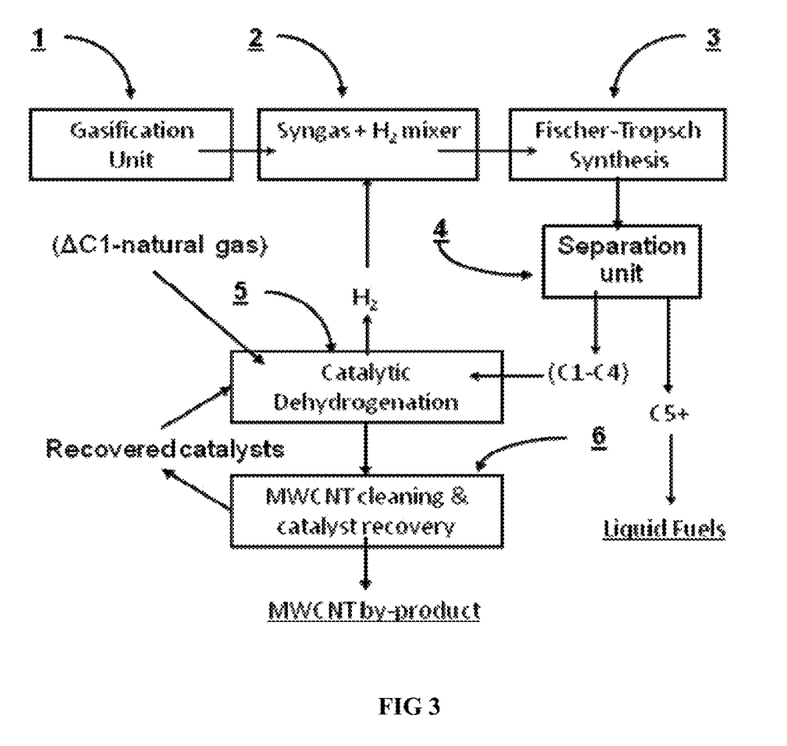
FIG. 3 is a schematic diagram of a FTS-CDH-MI system of this invention.

A schematic diagram of a Fischer-Tropsch-Synthesis, Catalytic-Dehydrogenation, Methane-Injection (FTS-CDH-MI) system is shown in FIG. 3. The FTS-CDH-MI liquid fuel production facility can achieve zero emissions of $CO_2$ and zero usage of water while producing the $H_2$ required for FTS and a valuable byproduct, MWCNT. The FTS-CDH-MI liquid fuel production facility is comprised of a gasification unit 1, a syngas+hydrogen mixing unit 2 which is downstream of the gasification unit 1, a Fischer-Tropsch-Synthesis unit 3, which is downstream from the syngas+hydrogen mixing unit 2, a separation unit 4, which separates the gaseous FTS products (C1-C4) from the C5+ products by condensation of the C5+ products, which are liquids at and below room temperature, a catalytic dehydrogenation unit 5 receiving the (C1-C4) gases and methane (ΔC1) separated from natural gas, and a MWCNT cleaning and catalyst recovery unit 6.

It should be noted that the feedstock to the gasification unit 1 in FIG. 3 is not limited to coal but may include a wide variety of biomass (such as switchgrass, corn stover, agricultural wastes, lawn wastes, woody biomass wastes from lumbering, and waste products from paper production). Waste hydrocarbons such as waste plastics could be gasified but this is not recommended, since a more promising alternative method based on a pyrolysis process has been developed that converts these waste polymers into a valuable product, lubricating oil. ("Conversion of Waste Plastic to Lubricating Base Oil", Stephen J. Miller, Naresh Shah, and Gerald P. Huffman, *Energy & Fuels*, 19 (2005) 1580-1586; "Method for Conversion of Waste Products to Lube Oil," Stephen J. Miller, Gerald P. Huffman, and Naresh Shah, U.S. Pat. No. 6,150,577, Issued/Filed Dates: Nov. 21, 2000/Dec. 30, 1998.)

All of these feed-stocks can be gasified at a relatively high temperature and pressure to produce a syngas consisting primarily of CO and $H_2$, which is directed to the FTS unit 2 (See FIG. 3). The FTS hydrocarbon product stream is separated into C1-C4 hydrocarbons and C5+ hydrocarbons in the separation unit 4, which may be a simple condensation apparatus that cools both the C1-C4 and C5+ FTS products to room temperature or slightly lower. At room temperature, all of the C1-C4 FTS products are gases, while all of the FTS C5+ products, which are primarily n-alkanes and n-alkenes, are liquids. The boiling points of the C1-C4 products range from −263.2° F. (−164.0° C.) for methane to 31.1° F. (−0.5° C.) for butane. The lowest boiling point for the C5+ FTS products is that of pentane, 97.2° F. (36.2° C.). Therefore, the C1-C4 products and C5+ products can be easily separated by condensation of the C5+ products at or slightly below room temperature {(68-77° F.)/(~20-25° C.)}.

The C5+ hydrocarbons are then processed into liquid fuels such as gasoline, diesel fuel and jet fuel. The C1-C4 hydrocarbon gases are delivered to the catalytic dehydrogenation unit 5 where they are subjected to CDH to produce $H_2$ and multi-walled carbon nanotubes (MWCNT). Advantageously, the $H_2$ is added to the syngas in the mixing unit 2 in order to increase the $H_2/CO$ ratio to levels required for FTS of liquid fuels. If additional $H_2$ is required to raise the $H_2/CO$ ratios to values ≥2.0, additional methane is injected into the CDH reactor.

The carbon nanotubes are delivered to the MWCNT cleaning and catalyst recovery unit 6, where the MWCNT are cleaned in a dilute nitric acid solution in order to dissolve the catalyst. This produces clean MWCNT that are approximately 99.5% carbon and can be removed from the solution by, for example, centrifugation or filtration. The catalyst can then be recovered from the cleaning solution by adding appropriate bases to precipitate it, for example, in the form of metallic oxides or oxyhydroxides. These recovered catalysts can ultimately be recycled to the catalytic dehydrogenation unit 5, where they are quickly returned to their active metallic form by reduction in the reducing atmosphere of the CDH unit. The cleaned MWCNT can be sold on the market and used to create other products.

Any known method of gasification may be used in the FTS-CDH process. However, methods of gasification that produce a $H_2/CO$ ratio for the coal-derived syngas ≥0.6 are preferred. Of course, it is known in the art that the ratio may vary greatly, depending on the method of gasification and the composition of the oxidizing gas, which is normally a mixture of oxygen or air and steam.

The current method may also use any known method for FTS processing. Currently, the fixed-bed tubular reactor is favored by Sasol, the South African company that leads the world in the commercial development of FTS liquid transportation fuel production. No matter which FTS processing method is used, it is beneficial to complete the FTS processing at temperatures of approximately 200-300° C. using a Co-based FTS catalyst in order to produce fairly high yields of C1-C4 product. Fe-based FTS catalysts are not used in the FTS-CDH or FTS-CDH-MI process because Fe is an excellent catalyst for the water-gas shift (WGS) reaction, which produces carbon dioxide.

The separation of the C1-C4 product stream from the C5+ product stream may be accomplished by condensation of the C5+ products, which are primarily n-alkanes and n-alkenes, and have significantly higher boiling points than the C1-C4 products. As discussed earlier, all C5+ FTS products are liquids and all C1-C4 FTS products are gases at room temperature, making separation by condensation relatively easy.

With respect to catalytic dehydrogenation of the C1-C4 production stream, any catalytic dehydrogenation process in which the catalysts exhibit relatively long lifetimes (~20 hours or more) and high $H_2$ yields (~60 to 80%) can be used. The applicant is a co-inventor of one particularly useful catalytic dehydrogenation (CDH) process that is disclosed in issued U.S. Pat. No. 6,875,417. The full disclosure of this patent is incorporated herein by reference. This catalytic dehydrogenation process includes the step of passing the C1-C4 hydrocarbons over a catalyst comprising a binary Fe-based alloy catalyst on one of several types of supports.

Fe-alloy catalysts that have been successfully tested to date include Fe—Ni, Fe—Mo, Fe—Pd, and Fe—Mn. Supports that have been successfully utilized to date include γ-$Al_2O_3$, high surface area $SiO_2$, MWCNT, and a basic support, Mg(Al)O. Carbon nanotubes produced using catalysts on basic supports are easily cleaned because basic supports are easily dissolved in a dilute nitric acid solution. MWCNT produced on MWCNT supports are found to consist of approximately 99.5% carbon after similar cleaning Typical processing temperatures for CDH range from 400° C. to 900° C., with a preferred temperature range of approximately 600 to 800° C.

CDH at temperatures in the range of 500 to 850° C. converts $CH_4$ to $H_2$ and MWCNT, while (C2-C4) hydrocarbons (ethane, propane, etc.) are converted into $CH_4$ and minor amounts of $H_2$ and amorphous C at ~450 to 500° C. The dominant reaction for (C1-C4) hydrocarbons above 500° C. is therefore the conversion of methane to $H_2$ and MWCNT. Excellent, low-cost Fe-alloy catalysts have been developed for the CDH reaction. These include Fe—Ni, Fe—Mn, Fe—Mo, and Fe—Pd, with typical compositions of 60-70 mol % Fe and 30-40 mol % of the secondary element deposited on several different supports by standard techniques such as incipient wetness. The preferred supports are MWCNT, Mg(Al)O, and MgO. As noted above, the diameters of the MWCNT are typically 7-10 nm in diameter which yields precipitated Fe—Ni, Fe—Mn, Fe—Mo, and Fe—Pd catalyst particles that are typically 1-3 nanometers in mean diameter. The nanoparticles are rapidly converted to metallic alloys that are ideal for the conversion of C1-C4 gases into H2 and MWCNT. The Mg(Al)O and MgO supports also yield a dispersion of nanoparticle Fe-alloy CDH catalysts that are easily cleaned for re-use because these supports are easily dissolved using a dilute nitric acid solution. This also enables easy recovery and recycling of the Fe-alloy catalysts from the cleaning solution. These alloys are reduced to metallic alloys in the $H_2$-rich atmosphere of the CDH reactor. Fe—Ni, Fe—Mn, and Fe—Pd all form austenitic alloys (fcc) and exhibit excellent activity for CDH of $CH_4$ into $H_2$ and MWCNT in the temperature range from approximately 500 to 850° C. Fe—Mo alloys exhibit similar catalytic behavior but have a more complicated structure. The structures of all these Fe-alloy catalysts have been characterized by multiple techniques, including Mössbauer spectroscopy, XAFS spectroscopy, x-ray diffraction, and electron microscopy.

During CDH at temperatures ≥600° C., the only gases observed are $H_2$ and un-reacted $CH_4$, which forms an activated complex with the Fe-alloy catalyst. As the temperature rises, the bonds of the activated complex break to form $H_2$ and solid carbon in the form of MWCNT ($C_M$). The optimum CDH temperature is in the range of approximately 700-850° C., where the $H_2$ production levels off at about 80 to 90%. As fresh methane is continuously supplied to maintain the activated complex in order to produce additional hydrogen, the ongoing CDH reaction is considered to be in a state of pseudo-equilibrium. This pseudo-equilibrium reaction is:

$$CH_4 \leftrightarrow [CH_4^\ddagger] \rightarrow MWCNT(C_M) + 2H_2 \qquad (3)$$

The rate constant (v) for this reaction at temperature T can be written as $$v=(k_BT/h)\cdot K^\ddagger_9(T)=(k_BT/h)\cdot \exp(-\Delta G^\ddagger/RT)=(k_BT/h)\cdot \exp(-\Delta H^\ddagger/RT+\Delta S^\ddagger/R) \qquad (4)$$

where $k_B$ and h are the Boltzmann and Planck constants, respectively, $k_BT/h$ is a fundamental frequency, and $K^\ddagger_p(T)$ is the psuedo-equilibrium constant at constant pressure and temperature T. $\Delta G^\ddagger$ is the "activation free energy", $\Delta H^\ddagger$ is the "activation enthalpy", and $\Delta S^\ddagger$ is the "activation entropy" of the reaction. From equation 1, the rate constant can also be written in terms of the mole fractions of $H_2$ and $CH_4$ as $$v=(k_BT/h)\cdot(H_2)^2/(CH_4) \qquad (5)$$

This gives $$\mathrm{Ln}\{(K^\ddagger_p(T)\}=\mathrm{Ln}\{(H_2)^2/(CH_4)\}=-\Delta H^\ddagger/RT+\Delta S^\ddagger/R \qquad (6)$$

The "activation enthalpy", $\Delta H^\ddagger$, can be provided by the energy released on cooling the syngas from the gasification temperature (typically 1,500-1,600 K) to an appropriate operating temperature for the CDH reaction (approximately 1,000 K). This means that the energy required for the CDH reaction can be provided by energy released during cooling of the syngas from gasification temperatures to the CDH reactor temperature. This energy can be calculated using enthalpy tables for CO and $H_2$. For a syngas with $H_2$/CO=0.8-1.0, it is found that $H^0$ (1,500 to 1,600 K)–$H^0$(1,000 K)=–7.86 to –9.51 kcal/mol of syngas. As noted above, to calculate typical numerical results of the FTS-CDH process with real data, 26 sets of experimental FTS data were selected from the literature. Only FTS data obtained using Co-based catalysts were used, since Co is not a WGS catalyst. Fe is an excellent WGS catalyst, so the use of Fe-based catalysts in the CDH process would be counter-productive. For the 26 FTS experimental data sets, the (C1-C4) products contained an average of 28.7 mol % of the C, which yields an average energy from this source for CDH of the (C1-C4) products of –27.4 to –33.1 kcal/mol, which is close to the values of the activation enthalpy, $\Delta H^\ddagger$, derived from FIG. 2 and shown in Table 1.

TABLE 1

Figure 2:
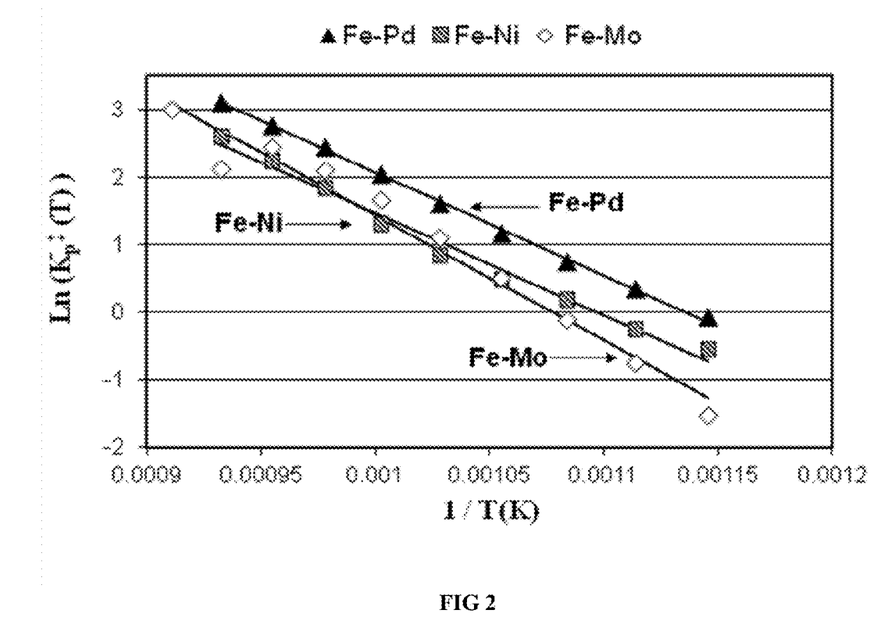
FIG. 2 is a graph showing the Logarithm (Ln) of the equilibrium constant of the pseudo-equilibrium reaction vs. 1/T (K) for three different catalytic dehydration (CDH) catalysts, Fe—Ni, Fe—Pd, and Fe—Mo.

| $\Delta H^\ddagger$ and $\Delta S^\ddagger$ determined from the slopes and intercepts of the plots in FIG. 2. | | | |
|---|---|---|---|
| Catalyst | $\Delta H^\ddagger$ (kcal/mol) | $\Delta S^\ddagger$ (cal/mol/K) | $\Delta G^\ddagger$ (kcal/mol) |
| Fe-Ni/$Al_2O_3$ | 30 | 32.9 | –2.9 |
| Fe-Pd/$Al_2O_3$ | 30.2 | 34.3 | –4.1 |
| Fe-Mo/$Al_2O_3$ | 36.9 | 39.7 | –2.8 |

As shown in FIG. 1, nearly half of the $H_2$/CO molar ratios are raised from an initial value of 0.8 to 2.0 or higher, while almost all exceed 1.5. By using the CDH reaction to produce the $H_2$ required to raise the $H_2$/CO ratio rather than the traditional water-gas-shift reaction, large emissions of $CO_2$ are avoided, large amounts of water are saved, and a valuable byproduct, multi-walled carbon nanotubes (MWCNT) is produced. As an example, the amounts of $CO_2$ emissions avoided, water saved, and MWCNT produced by the FTS-CDH-MI process relative to those produced by the conventional FTS process were calculated for a 50,000 barrel/day plant.

Recently, large amounts of natural gas (NG) have been discovered in shale and rock formations in the U.S. and elsewhere, which can be produced at relatively low costs by the process known as hydraulic fracturing, or fracking, of these formations. This produces a large and relatively available source of methane, and therefore, it is logical to improve the FTS-CDH process by injecting methane, the major component of NG, into the CDH reactor of the FTS-CDH system to raise all of the $H_2$/CO ratios to 2.0 or higher.

To illustrate the process, it is assumed that the initial $H_2/CO$ ratio of the syngas leaving the gasification unit is either 0.6 or 0.8. The equations used to calculate the weight percentages of $H_2$ ($\Delta H_2$) and multi-walled carbon nanotubes ($\Delta C_M$) produced by CDH of the (C1-C4) products of FTS were derived in the previously cited paper, (Huffman) and are given below. The square brackets [ ] in the equations denote wt. % and the "par" and "ol" subscripts denote paraffins and olefins.

$$\Delta H_2 \text{ (wt \%)} = 25\% \times [C1] + 20.82\% \times [C2\text{-}C4]_{par} + 14.29\% \times [C2\text{-}C4]_{ol} \qquad (7)$$

$$\Delta C_M \text{ (wt \%)} = 75\% \times [C1] + 79.18\% \times [C2\text{-}C4]_{par} + 85.71\% \times [C2\text{-}C4]_{ol} \qquad (8)$$

The Anderson-Schultz-Flory relationship, given in equation (9) below, was used in deriving these equations. The value used for a, the methylene (—$CH_2$—) chain growth coupling probability, was 0.83, the average value for the 26 FTS data sets selected as examples for this research, $$W_n = n \times \alpha^n \times ((1-\alpha)^2/\alpha) \qquad (9)$$

Many FTS investigators neglect to measure the paraffin and olefin (C2-C4) contents separately and simply report the total amount of (C2-C4) products. In that case, it was assumed that the amount of paraffins was 85% and the amount of olefins was 15%, which is the average for the 26 FTS data sets. The relevant equations are then given by $$\Delta H_2 \text{ (wt \%)} = 25\% \times [C1] + 19.84\% \times [C2\text{-}C4]_{total} \qquad (10)$$

$$\Delta C_M \text{ (wt \%)} = 75\% \times [C1] + 80.16\% \times [C2\text{-}C4]_{total} \qquad (11)$$

For initial $H_2/CO$ ratios of 0.6 and 0.8, the $H_2/CO$ ratios are then given by equations (12) and (13), respectively.

$$H_2/CO = 14 \times \{[4.110\% + \Delta H_2]/([100\%] - [4.110\% + \Delta H_2])\} \qquad (12)$$

$$H_2/CO = 14 \times \{[5.405\% + \Delta H_2]/([100\%] - [5.405\% + \Delta H_2])\} \qquad (13)$$

Figure 4:
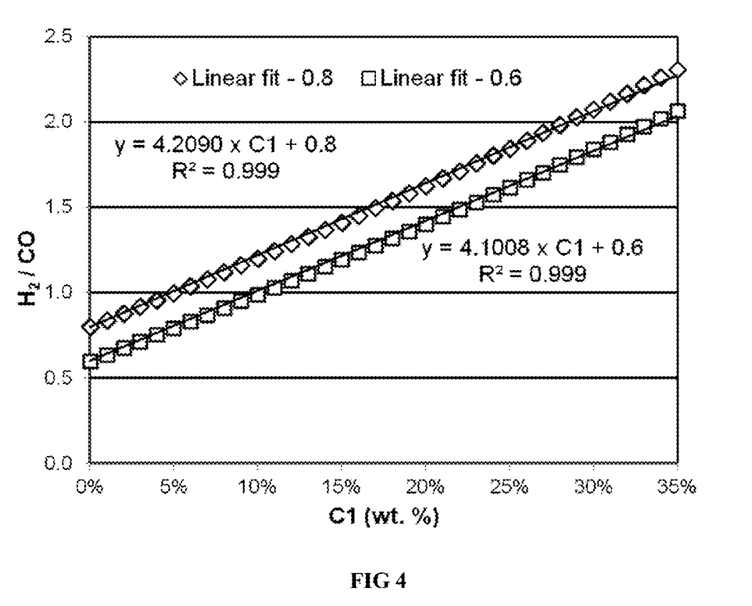
FIG. 4 is the linear plots of $H_2$/CO vs. C1 (wt. %) for initial $H_2$/CO values of 0.8 and 0.6.

If the increase in the $H_2/CO$ ratio produced by CDH of the (C1-C4) products of FTS is less than 2.0 or higher, which is usually the case, this can be overcome by injecting the correct amount of methane ($\Delta C1$) derived from NG into the CDH reactor, as illustrated in the schematic diagram of FIG. 3. The amount of methane injection (MI) required for any particular FTS data set can easily be determined from the slopes of the trendlines in FIG. 4.

Figure 5:
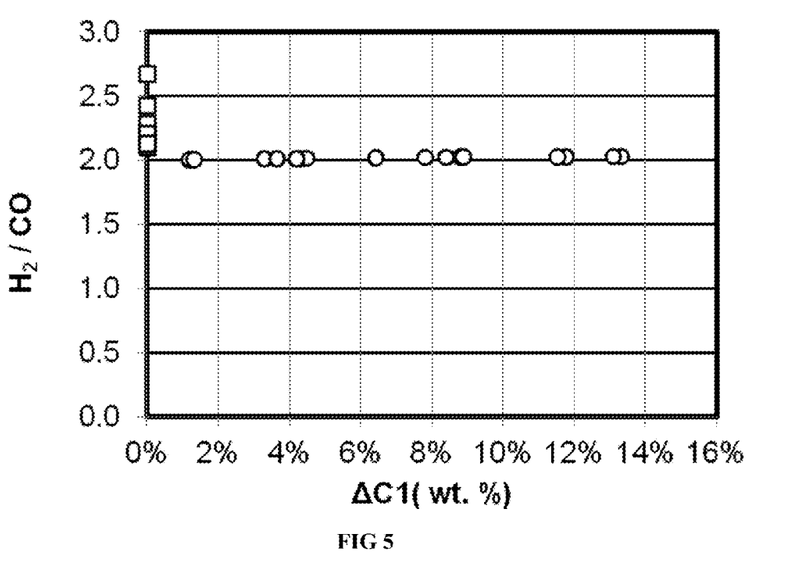
FIG. 5 shows $H_2$/CO ratios produced by the FTS-CDH-MI process versus the indicated wt. % of methane (C1) injected into the CDH reactor for a syngas with an initial $H_2$/CO value of 0.8.
Figure 6:
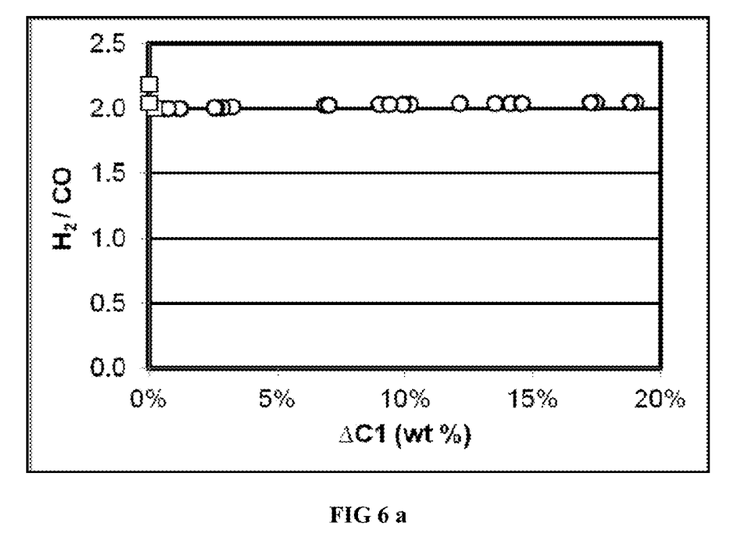

In FIG. 5, the $H_2/CO$ molar ratios plotted in FIG. 1 (initial ratio=0.8) have all been raised to 2.0 or higher by injecting the amounts of methane ($\Delta C1$) shown on the abscissa. The 10 square data points shown at $\Delta C1 = 0$ are the data points in FIG. 1 that achieved $H_2/CO$ ratios >2.0 from the $H_2$ produced by CDH of the (C1-C4) products of FTS. All the round data points required injection of the amounts of methane ($\Delta C1$ (wt. %) shown on the abscissa to achieve $H_2/CO = 2.0$.

Similar results were obtained from FTS-CDH-MI for a syngas with an initial $H_2/CO$ ratio of 0.6. The results are shown in FIG. 5. Only three of the $H_2/CO$ values were raised to 2.0 or higher by the $H_2$ produced by CDH of the FTS (C1-C4) products. These are the square data points. The remaining round data points required larger amounts of methane injection ($\Delta C1$) to reach $H_2/CO$ ratios $\geq 2.0$. The improvements of the $H_2/CO$ ratios produced by the FTS-CDH-MI process shown in FIG. 4 and FIG. 5 relative to the FTS-CDH process alone are striking, yielding syngas compositions for all 26 FTS data sets that have $H_2/CO$ ratios $\geq 2.0$ that are capable of producing liquid fuels.

The WGS reaction ($CO + H_2O \rightarrow H_2 + CO_2$) produces one molecule of $CO_2$ and uses one molecule of $H_2O$ for each molecule of $H_2$ it produces. At temperatures $\geq 450°$ C., the catalytic dehydrogenation (CDH) reaction converts methane and the (C2-C4) products of FTS into $H_2$ and multi-walled carbon nanotubes (MWCNT). This eliminates $CO_2$ emissions and avoids water useage by the WGS reaction. See U.S. Pat. Nos. 8,268,897 and 8,309,616 both invented by Huffman, and incorporated herein by reference.

Since methane ($\Delta C1$) is injected into the CDH reactor to raise the $H_2/CO$ ratios, the total percentage of gaseous products for a FTS-CDH-MI plant is effectively ($\Delta C1 + (C1\text{-}C4)$). Therefore the percentage of the total reactants yielding oil products is $C5+ = 100\% - (\Delta C1 + (C1\text{-}C4))$. Using an oil density of 825 kg/m³, typical of high quality crude oils and a U.S. standard barrel of petroleum size of 42 gallons (0.159 m³), the weight per barrel is 131 kg. For a 50,000 bbl/day plant, the total weight of oil produced per day is 7,229 tons. The C5+ weight percentage then yields a weight for the total output of all products of the plant. This allows the amounts of $H_2$ and MWCNT to be calculated from the percentages $\Delta H_2$ and $\Delta C_M$ produced by the CDH reaction. In addition, replacing the WGS reaction with CDH saves a huge amount of water and prevents the emission of very large amounts of $CO_2$. The weight of water saved = $18/2 \times$ the weight of $H_2$ produced by CDH, while the weight of $CO_2$ emissions avoided = $44/2 \times$ the weight of $H_2$ produced. The weights of $CO_2$ emissions avoided and $H_2O$ saved per day are shown graphically in FIG. 8 for the 26 FTS data sets.

Figure 7:
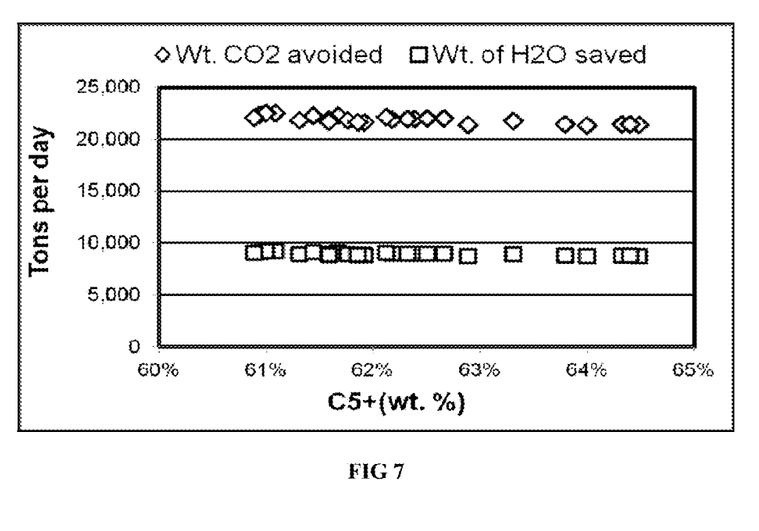
FIG. 7 shows the amounts of carbon dioxide ($CO_2$) emissions avoided and water ($H_2O$) saved per day in a FTS-CDH-MI plant relative to a conventional FTS plant.
Figure 8:
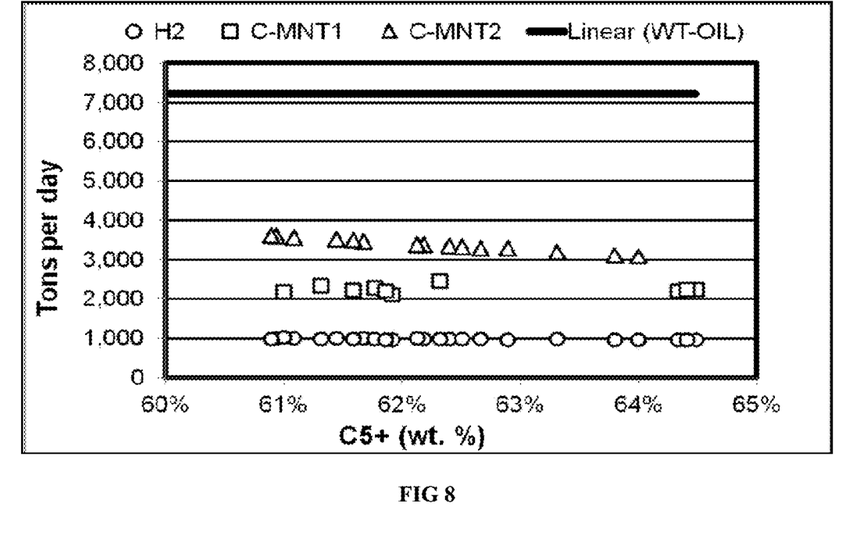
FIG. 8 shows the tons per day of products produced by a 50,000 barrels per day FTS-CDH plant versus the wt. % of oil products (C5+).
Figure 9:
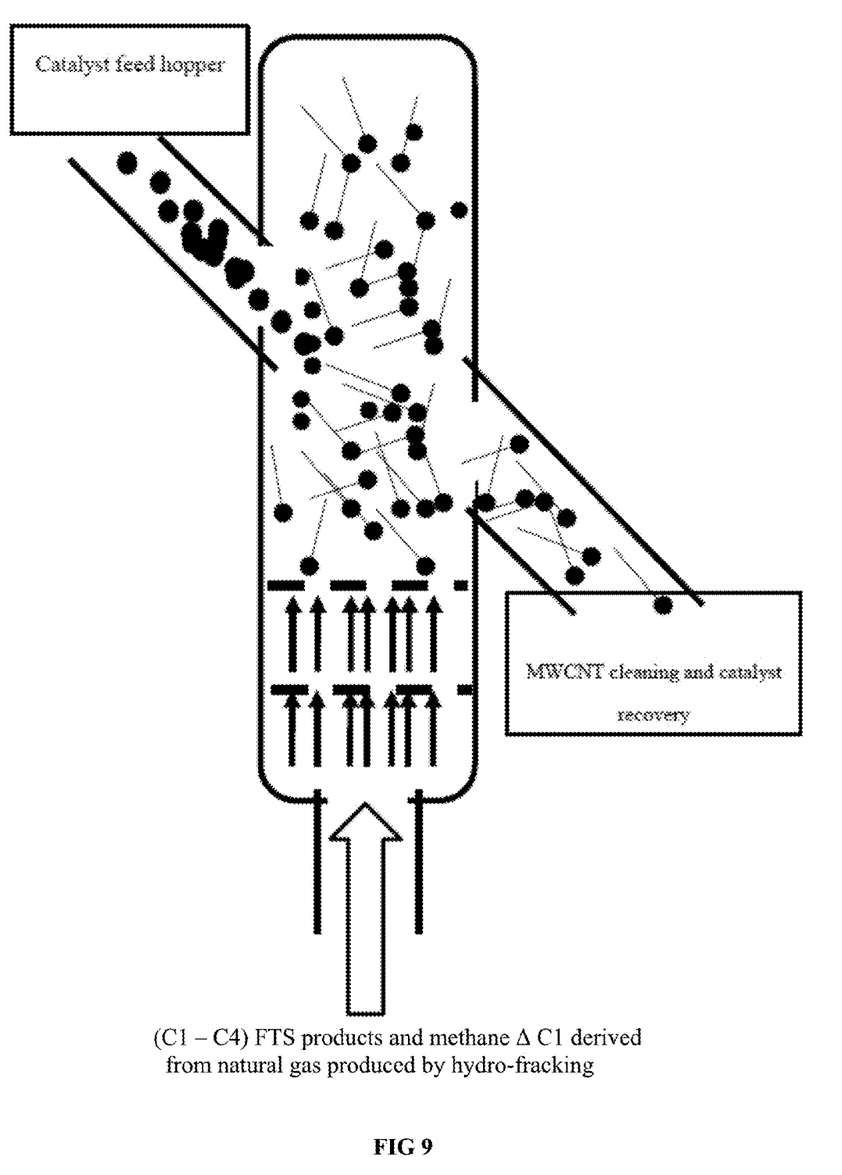
FIG. 9 is a schematic of a fluid bed reactor design, where the black circles represent CDH catalyst particles and the straight lines attached to the particles represent multi-walled carbon nanotubes (MWCNT).

FIG. 8 shows the amounts of all products produced by a 50,000 barrel/day FTS-CDH-MI plant: oil, MWCNT, and $H_2O$. It is worth noting that the MWCNT show two weight classes. The lighter of the two (C-MNT1) was from FTS data sets that measured both (C2-C4) paraffins and (C2-C4) olefins, while the heavier (C-MNT2) was from FTS data sets that measured only a combined value for the (C2-C4) products. FIG. 9 shows the amounts of oil, $H_2$ and MWCNT produced per day in a FTS-CDH-MI plant. The results shown graphically in FIG. 7 and FIG. 8 are very interesting. However, they re perhaps shown more clearly in Table 2, which gives the average results for the 26 FTS data sets that were examined in this research program.

TABLE 2

Products and environmental benefits for a 50,000 barrel/day FTS-CDH-MI plant.

| Products | Amounts (tons & gallons) |
|---|---|
| 50,000 barrels of oil | 7,229 tons/day, 2,100,000 gallons |
| $H_2$ | 1,000 tons/day |
| Total MWCNT | 2,930 tons/day |
| Environmental benefits | Amount |
| $CO_2$ avoided | 22,007 tons/day |
| $H_2O$ saved | 2,160,436 gal/day |

There are three major benefits of this process. The first is the elimination of the use of water, and therefore the waste of water and the discharge of either contaminated or heated water into the environment. The second benefit is the elimination of carbon dioxide emissions. The third benefit is the production of large amounts of multi-walled carbon nanotubes MWCNT. It is important to emphasize that many uses are developing for such large quantities of MWCNT. The most promising application for the large quantities of MWCNT that will be generated by the FTS-CDH-MI process is the production of high-strength, lightweight plastic-MWCNT composites. As discussed in an excellent review article (Z. Spitalskya, et al, *Progress in Polymer Science,* 35 (2010) 357-401), the tensile strengths and Young's moduli exhibit increases of 100-120% for MWCNT-polystyrene composites, 20-50% for MWCNT-high density polyethelene composites, 90-100% for MWCNT-low-density polyethelene composites, and 300% for the Young modulus of an "oxidized MWCNT"-polypropelene composite. The production of light-weight, high-strength vehicles from MWCNT-polymer composites could achieve much higher fuel efficiency than is now possible, which would also produce huge decreases in $CO_2$ emissions.

It is important to note that a significant amount of research has been done on gasification of coal-biomass mixtures. Since $CO_2$ produced by biomass is considered neutral, $CO_2$ from biomass that is eliminated by the (FTS-CDH-MI) process summarized in this patent should be considered negative. If 20% of the syngas is produced by gasification of biomass, the amount of $CO_2$ avoided in the example shown in the table below would be increased to 26,408 tons. If the gasification feedstock was all biomass, 100% of the $CO_2$ emissions avoided should be considered negative $CO_2$ emissions rather than neutral $CO_2$ emissions.

Platinum (Pt) nanoparticles supported on MWCNT and Stacked-Cone Nanotubes (SCNT) have been shown to exhibit excellent activity for CDH of high hydrogen-content liquids, including cyclohexane, methyl cyclohexane, tetralin, and decalin. CDH of such high hydrogen-content liquids could be used to provide an on-board supply of hydrogen for vehicles powered by fuel-cells. (Y. Wang, N. Shah, and G. P. Huffman, *Energy & Fuels,* 18, 1429-1433).

Figure 10:
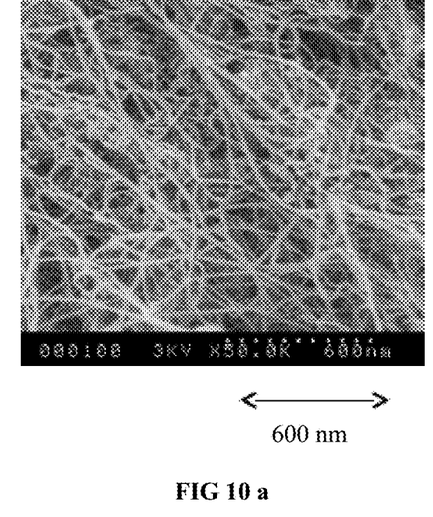

A semi-continuous fluid-bed CDH reactor system has been developed that worked well for periods of 3-4 days with little or no loss of activity. (N. Shah, S. Ma, Y. Wang, G. P. Huffman, "Semi-continuous hydrogen production from catalytic methane decomposition using a fluidized-bed reactor", *Int. J. of Hydrogen Energy* 32 (2007) 3315-3319.) A detailed diagram of such a fluid-bed reactor is shown in FIG. 9. As indicated, Fe-based alloy catalysts would be continuously fed to the fluid-bed reactor from a hopper to be reacted in the (C1-C4) gases produced by FTS and methane produced from natural gas by hydro-fracking. Methods of separating methane from other minor components of natural gas, such as $CO_2$, are well known. Pressure-Swing Absorption is a method that is commonly used. Typical electron micrographs of multi-walled carbon nanotubes produced by the FTS-CDH-MI process for producing liquid fuels from coal and natural gas with zero emissions of $CO_2$ and no usage of water are shown in FIG. 10 *a*. The top micrograph shown as FIG. 10 *a* was obtained with a scanning electron microscope (SEM) and the bottom micrograph shown as FIG. 10 *b* was taken with a high resolution transmission electron microscope (TEM). The scale of the figures is shown below the micrographs. It is seen in FIG. 10 *b* that the MWCNT consist of nine concentric graphene layers about 0.5 nanometer apart, while the hollow center of the tubes is about 5 nanometers in diameter. A thin coating of amorphous carbon about 1-2 nanometers thick is seen on the outer surface of the MWCNT. This can be removed in the cleaning vessel shown in FIG. 9 by washing in a dilute nitric acid solution. The catalysts can also be recovered in the washing operation.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are examples only, and are not exhaustive of the scope of the invention. Consequently, the present invention is intended to be limited only by the spirit and scope of the claims, giving full cognizance to equivalents in all respects.

I claim:

1. A method of producing liquid fuels with zero carbon dioxide emission and zero usage of water during the production process, the method comprising:
   providing a synthesis gas (syngas) by the gasification of coal or coal and biomass;
   subjecting said syngas to Fischer-Tropsch synthesis (FTS) to produce a hydrocarbon product stream;
   separating said hydrocarbon product stream into gaseous hydrocarbons that have from one to four C atoms (methane, ethane, propane, butane, etc.), which are commonly referred to as (C1-C4) hydrocarbons, and C5+ hydrocarbons used for the production of as liquid fuels;
   providing an enhanced catalytic dehydrogenation (CDH) process by the injection of a stream of methane gas;
      wherein said stream of methane gas increases the $H_2$/CO ratio of the CDH process to 2.0 or higher;
   subjecting said (C1-C4) hydrocarbon stream to said enhanced catalytic dehydrogenation process to produce hydrogen ($H_2$) and multi-walled carbon nanotubes (MWCNT);
   mixing said $H_2$ with the syngas to increase the $H_2$/CO ratio of the gas for FTS to 2.0 or higher, thereby enabling production of liquid fuels without the use of water ($H_2O$) and eliminating the production of $CO_2$.

2. The method of producing liquid fuels with zero carbon dioxide emission and zero usage of water during the production process of claim 1, wherein said methane gas is natural gas.

3. The method of producing liquid fuels with zero carbon dioxide emission and zero usage of water during the production process of claim 2, wherein said syngas is derived from coal, biomass, or a mixture thereof.

4. The method of producing liquid fuels with zero carbon dioxide emission and zero usage of water during the production process of claim 1, wherein said separating step is accomplished by performing distillation.

5. The method of producing liquid fuels with zero carbon dioxide emission and zero usage of water during the production process of claim 1, wherein said separating step is accomplished by cooling said hydrocarbon product stream to achieve separation by condensation.

6. The method of producing liquid fuels with zero carbon dioxide emission and zero usage of water during the production process of claim 4, including the further step of;
   utilizing the energy released in cooling the hydrocarbon product stream from a gasification temperature of between about 1,500-1,600° K to a useful operating temperature for the CDH reaction of about 1,000° K to provide the activation enthalpy required for catalytic dehydrogenation.

7. The method of producing liquid fuels with zero carbon dioxide emission and zero usage of water during the production process of claim 1, including the further step of;
   passing said (C1-C4) hydrocarbons over a binary metallic iron-based alloy catalyst, Fe-M.

8. The method of producing liquid fuels with zero carbon dioxide emission and zero usage of water during the production process of claim 7 wherein said binary metallic iron-based alloy catalyst, Fe-M consists of Fe and a secondary metal M selected from a group consisting of Ni, Mo, Mn, Pd, V, Cr, Co, Zn, W, and any mixture thereof.

9. The method of producing liquid fuels with zero carbon dioxide of claim 1, including the further steps of;
  cleaning said MWCNT and dissolving said CDH catalyst in a cleaning solution;
  recovering the MWCNT from the cleaning solution by centrifugation, filtration, or other techniques; and
  recovering said catalyst from the resulting cleaning solution by standard precipitation methods and recycling it to the CDH reactor.

10. The method of producing liquid fuels with zero carbon dioxide of claim 1, wherein said enhanced catalytic dehydration process is at a temperature above 450° C.

11. The method of producing liquid fuels with zero carbon dioxide of claim 1, wherein said enhanced catalytic dehydration process is at a temperature above 600° C.

12. The method of producing liquid fuels with zero carbon dioxide of claim 1, wherein said enhanced catalytic dehydration process is at a temperature between 700° C. and 850°.

* * * * *